United States Patent [19]

Shinoda et al.

[11] Patent Number: 4,539,190
[45] Date of Patent: Sep. 3, 1985

[54] METHOD FOR THE TREATMENT OF EXHAUST GASES

[75] Inventors: Naoharu Shinoda; Atsushi Tatani; Kenji Inoue; Susumu Okino, all of Hiroshima, Japan

[73] Assignee: Mitsubishi Jukogyo Kabushiki Kaisha, Tokyo, Japan

[21] Appl. No.: 649,482

[22] Filed: Sep. 11, 1984

[51] Int. Cl.$^3$ .................................................. B01D 53/34
[52] U.S. Cl. ...................................... 423/240; 423/242
[58] Field of Search ................. 423/240, 241, 242 A, 423/242 R; 55/71

[56] References Cited

U.S. PATENT DOCUMENTS 3,876,750  4/1975  Hauser ........................... 423/242 A
4,108,959  8/1978  Tatani et al. ........................ 423/240

Primary Examiner—Earl C. Thomas
Attorney, Agent, or Firm—Birch, Stewart, Kolasch & Birch

[57] ABSTRACT

A method for the wet treatment of combustion exhaust gases comprising $SO_2$ and HCl, the method comprising detecting an amount of HCl in the exhaust gas and feeding, to an exhaust gas treating tower, a sodium salt in an amount corresponding to at least the detected amount of HCl so that all the HCl is able to be converted into NaCl in the exhaust gas treating tower, along with $CaCO_3$ or $Ca(OH)_2$ used as an $SO_2$ absorbent.

2 Claims, 1 Drawing Figure

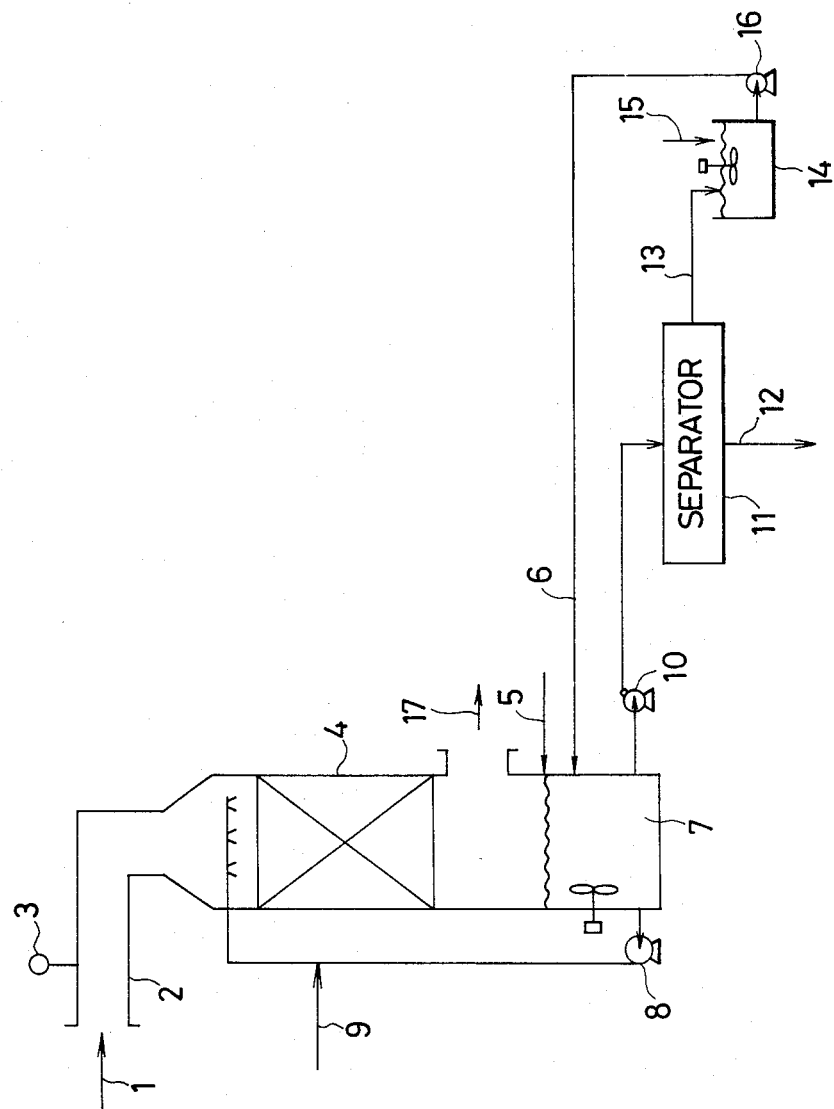

METHOD FOR THE TREATMENT OF EXHAUST GASES

This invention relates to a wet treatment of exhaust gases comprising $SO_2$ and HCl such as exhaust gases from coal firing, heavy oil combustion exhaust gases and the like.

Flue gas desulfurization apparatus using wet lime and gypsum techniques are known in which limestone or slaked lime is used as an absorbent to remove $SO_2$ from exhaust gases and collect the resulting gypsum as a by-product. Such apparatus have been widely utilized for the treatment of exhaust gases from oil-fired boilers. As is well known, an increasing number of boilers have recently made use of coal in Japan and, in some instances, heavy oil is also used for these purposes. However, exhaust gases generated by combustion of coal or heavy oil may contain larger amounts of dust, $SO_2$, HCl, HF and the like than exhaust gases from oil firing. Especially, when exhaust gases comprising $SO_2$ and HCl in large amounts are treated with an absorbent such as $CaCO_3$ or $Ca(OH)_2$, $SO_2$ reacts with $CaCO_3$ or $Ca(OH)_2$ to produce calcium sulfite and at the same time, HCl reacts with $CaCO_3$ or $Ca(OH)_2$ to produce $CaCl_2$ which has high solubility. Dissolution of $CaCl_2$ results in an increase of $Ca^{2+}$ ions, leading to reduction in amount of dissolution of calcium sulfite, calcium sulfate (produced by oxidation of calcium sulfite with oxygen in the exhaust gas), calcium carbonate and calcium hydroxide. More particularly, as $Ca^{2+}$ ions which are common ions for these compounds increase, anions of $SO_3^{2-}$, $SO_4^{2-}$, $CO_3^{2-}$ and $OH^-$ decrease, which in turn brings about an increase of the partial pressure of $SO_2$ in an absorption slurry or a decrease in concentration of a dissolved absorbent. As a consequence, the desulfurization rate lowers with an attendant disadvantage that because the solubility of calcium sulfate decreases, gypsum scales are apt to deposit.

HCl in the exhaust gas is collected as $CaCl_2$ by reaction with $CaCO_3$ or $Ca(OH)_2$ used as the absorbent. While $SO_2$ is absorbed, oxidized, removed by filtration in the form of secondarily produced gypsum crystals and withdrawn to outside, $CaCl_2$ having great solubility is entrained in the filtrate after separation of the gypsum crystals. Almost all of the filtrate is circulated and used as a liquid for adjustment of the absorbent, with the result that $CaCl_2$ is accumulated in the slurry being circulated in the absorption tower, promoting the above disadvantage still more.

We have made studies on a method of preventing the adverse influence of $CaCl_2$ and, as a result, found that when HCl in exhaust gases is fixed as NaCl, the disadvantages can be overcome. The present invention is accomplished based on the above finding. According to the invention, there is provided a method for the treatment of exhaust gases comprising $SO_2$ and HCl which comprises detecting an amount of HCl in an exhaust gas, and feeding, to an exhaust gas treating tower, a sodium salt capable of producing NaCl by reaction with $CaCl_2$, e.g. $Na_2SO_4$, $Na_2SO_3$, NaOH, $Na_2CO_3$, $NaHCO_3$, $NaHSO_3$ and the like, in an amount corresponding to the amount of HCl and $CaCO_3$ or $Ca(OH)_2$ used as an absorbent for $SO_2$.

By the method described above, all chlorides in a circulation slurry can be present as NaCl, so that deterioration of desulfurization performance and promotion in growth of gypsum scale can be suitably prevented for reasons described hereinafter. In carrying out the method of the invention, amounts of HCl and $SO_2$ in an exhaust gas are detected and a sodium salt is added to the circulation slurry so that a molar concentration $[Na^+]$ of sodium ions in the slurry being circulated in the absorption tower has an interrelation with a molar concentration $[Cl^-]$ of chlorine ions according to the following equation (1)

$$[Na^+] \geqq [Cl^-] \tag{1}$$

and $CaCl_2$ is all converted into NaCl according to the following formula (2)

$$CaCl_2 + Na_2X \rightarrow 2NaCl + CaX \tag{2}$$

in which X represents an anion.

Wet methods of treating exhaust gases in which calcium and sodium compounds are used in combination so as to absorb $SO_2$ therewith are known, for example, in Japanese Pat. Nos. 894725 and 903276 and Japanese Laid-open Patent Application Nos. 53-129167, 55-124530, 56-65615 and 51-97597. However, there has never been known a method in which a sodium salt is fed in an amount corresponding to an amount of HCl, which is one of important features of the present invention, while absorbing $SO_2$ with $CaCO_3$ or $Ca(OH)_2$.

In Japanese Laid-open Patent Application No. 53-17565, there is described a method of treating exhaust gases comprising $SO_2$ and HCl in which a magnesium compound is fed in an amount corresponding to an amount of HCl. Subsequent studies revealed that this method involved the disadvantage in that the magnesium compound reacted with HCl and the resulting $MgCl_2$ did not remain dissolved stably. This is because if $Ca(OH)_2$ or $CaCO_3$ used as an absorbent for $SO_2$ remained in excess, the pH of the slurry being circulated in the absorption tower would become high, with the attendant disadvantage that $MgCl_2$ would decompose into $Mg(OH)_2$ in the form of a precipitate with formation of soluble $CaCl_2$. In addition, when the pH of the slurry reaches about 8 under conditions where small amounts of various cations dissolved in the circulation slurry coexist, part of $Mg^{2+}$ ions start to precipitate, so that even with a slurry in which $Ca(OH)_2$ or $CaCO_3$ are not left in so large amount, $MgCl_2$ unfavorably decomposes.

In the practice of the invention, HCl is converted into stably dissolved NaCl and thus the above disadvantages can be overcome.

Objects, features and advantages of the present invention will become apparent from the following detailed description with reference to the accompanying drawing.

In the drawing, a sole FIGURE is a flowchart of a pilot plant used to effect a test for examples and comparative example.

The data of examples according to the method of the invention and comparative example is obtained using a pilot plant shown in the sole FIGURE.

In the figure, an exhaust gas 1 from coal firing is passed to a flue 2 having a $SO_2$ and HCl concentration detector 3. By the detector 3 are determined amounts of $SO_2$ and HCl being charged into an absorption tower 4. A sodium compound from a line 5 is added to the absorption tower 4, in an amount corresponding to the amount of HCl and $CaCO_3$ or $Ca(OH)_2$ absorbent is added from a line 6 to the absorption tower 4 in an amount corresponding to the amount of $SO_2$. A slurry in a tank 7 for the absorption tower is circulated through the absorption tower by means of a circulation pump 8. In order to control a concentration of the slurry, makeup water may be added from a line 9.

The calcium and sodium compounds being added for absorption of $SO_2$ and HCl are subjected to reaction in the absorption tower tank 7 to form crystals of calcium sulfite and calcium sulfate. On the other hand, NaCl is produced as a dissolved component. From the standpoint of material balance, the slurry is withdrawn from the tank 7 through a pump 10 to a separator 11. In the separator 11 the crystals of the calcium compound are withdrawn from a line 12 and the resulting filtrate is fed through a line 13 to an absorbent tank 14, to which $CaCO_3$ or $Ca(OH)_2$ serving as an $SO_2$ absorbent is fed from a line 15 to prepare an absorbent slurry, followed by passing from a pump 16 through the line 6 to the absorption tower 4.

On the other hand, a purified gas 17 is discharged from the absorption tower 4 and released into the air through a de-mister (not shown) or a gas heater (not shown).

COMPARATIVE EXAMPLE

This comparative example illustrates a prior art method in which the line 5 was closed in order not to feed a sodium compound. Test conditions are indicated in Table 1 below.

TABLE 1

| Pilot Plant Test Conditions | |
|---|---|
| Absorbent | $CaCO_3$ |
| Flow rate of a gas being treated | 2,000 $Nm^3/H$ (on dry basis) |
| Concentration of $SO_2$ in a gas at inlet of absorption tower | 900 ppm (on dry basis) |
| Concentration of HCl in a gas at inlet of absorption tower | 40 ppm (on dry basis) |
| Exhaust gas source | combustion exhaust gas of finely divided coal |
| Liquid-gas ratio in absorption tower | 17.7 $l/Nm^3$ |

The slurry composition in the absorption tower tank in the stationary state and the composition of an exhaust gas at the outlet of the absorption tower are, respectively, indicated in Tables 2 and 3.

TABLE 2

| Slurry Composition in the Tank of the Absorption Tower | |
|---|---|
| $CaSO_4.2H_2O$ | 0.80 mol/l |
| $CaSO_3.\frac{1}{2}H_2O$ | 0.10 mol/l |
| $CaCO_3$ | 0.20 mol/l |
| $CaCl_2$ | 0.10 mol/l |
| pH | 5.5 |

TABLE 3

| Gas Composition at the Outlet of the Absorption Tower | |
|---|---|
| Concentration of $SO_2$ at the outlet of absorption tower | 100 ppm |
| Concentration of HCl at the outlet of absorption tower | below 1 ppm |

After operation of the test plant over 280 hours, it was found that gypsum scale deposited on and locally clogged the filler in the absorption tower.

EXAMPLE 1

According to the method of the invention, the line 5 was opened, through which NaOH was fed as a sodium compound to the absorption tower in an amount corresponding to an amount of HCl being passed into the tower, by which $Na^+$ and $Cl^-$ ions dissolved in the tank were controlled to satisfy the equation (1).

The test conditions other than the feed of NaOH were the same as those indicated in Table 1. The slurry composition in the tank in the stationary state and the gas composition at the outlet of the absorption tower are, respectively, indicated in Tables 4 and 5.

TABLE 4

| Slurry Composition in Tank of Absorption Tower | |
|---|---|
| $CaSO_4.2H_2O$ | 1.0 mol/l |
| $CaSO_3.\frac{1}{2}H_2O$ | 0.05 mol/l |
| $CaCO_3$ | 0.05 mol/l |
| NaCl | 0.20 mol/l |
| pH | 5.5 |

TABLE 5

| Gas Composition at the Outlet of the Absorption Tower | |
|---|---|
| Concentration of $SO_2$ at the outlet of absorption tower | 45 ppm |
| Concentration of HCl at the outlet of absorption tower | below 1 ppm |

As compared with the comparative example where $CaCl_2$ is dissolved, better results are obtained: desulfurization performance is improved; the reactivity of $CaCO_3$ absorbent becomes high; and the remaining concentration of $CaCO_3$ is reduced.

At the time when the test plant was continuously operated over 300 hours, no growth of gypsum scale was found, which was significantly different from the case of Comparative Example.

EXAMPLE 2

The general procedure of Example 1 was repeated using $Na_2CO_3$ instead of NaOH. $Na^+$ and $Cl^-$ ions dissolved in the slurry of the tank were used to satisfy the equivalence relation in the form of NaCl with its concentration being the same as in Example 1. Thus, the disadvantage of Comparative Example 1 where Cl ions were dissolved a $CaCl_2$ could be overcome.

EXAMPLE 3

The general procedure of Example 1 was repeated using, instead of NaOH, $Na_2SO_3$, $Na_2SO_4$, $NaHCO_3$, and $NaHSO_3$. As a result, it was found that the disadvantage involved in Comparative Example wherein $CaCl_2$ was dissolved could be overcome. $Cl^-$ and $Na^+$ ions dissolved in the tank slurry satisfied the expression of $[Na^+] \geq [Cl^-]$ with results similar to the results of Example 1.

We claim:
1. A method for the wet treatment of a combustion exhaust gas comprising $SO_2$ and HCl, the method comprising detecting an amount of HCl in the exhaust gas, and feeding, to a circulating slurry in an exhaust gas treating tower, (a) a sodium salt in an amount corresponding to at least the detected amount of HCl so that all the HCl is able to be converted into NaCl in the exhaust gas treating tower and (b) $CaCO_3$ or $Ca(OH)_2$ serving as an absorbent for $SO_2$.

2. The method according to claim 1, wherein the sodium salt is added to the slurry in the absorption tower in an amount sufficient to satisfy the following equation $$[Na^+] \geq [Cl^-]$$

in which $[Na^+]$ represents a molar concentration of sodium ions, and $[Cl^-]$ represents a molar concentration of chlorine ions.

* * * * *